United States Patent
Reiter et al.

(10) Patent No.: US 12,165,442 B2
(45) Date of Patent: Dec. 10, 2024

(54) FILTERING OF OPERATING SCENARIOS IN THE OPERATION OF A VEHICLE

(71) Applicant: Robert Bosch GmbH, Stuttgart (DE)

(72) Inventors: Antonia Reiter, Stuttgart (DE); Indrasen Raghupatruni, Hemmingen (DE); Maria Belen Bescos Del Castillo, Moensheim (DE); Christian Bartelt, Neustadt An der Weinstraße (DE); Guido Drechsel, Mannheim (DE); Lars Hoffmann, Mannheim (DE); Noah Metzger, Mannheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 354 days.

(21) Appl. No.: 17/688,294

(22) Filed: Mar. 7, 2022

(65) Prior Publication Data
US 2022/0292888 A1    Sep. 15, 2022

(30) Foreign Application Priority Data
Mar. 10, 2021 (DE) ............ 10 2021 202 334.7

(51) Int. Cl.
*G06F 11/34* (2006.01)
*G06F 17/40* (2006.01)
*G07C 5/06* (2006.01)
*G06F 11/36* (2006.01)

(52) U.S. Cl.
CPC ............ *G07C 5/06* (2013.01); *G06F 11/3476* (2013.01); *G06F 17/40* (2013.01); *G06F 11/3684* (2013.01)

(58) Field of Classification Search
CPC .. G06F 11/2476; G06F 11/3684; G06F 17/40; G06F 11/3476
See application file for complete search history.

(56) References Cited

U.S. PATENT DOCUMENTS

| 10,255,168 | B2* | 4/2019 | Stefan | G06F 11/3604 |
|---|---|---|---|---|
| 2009/0216728 | A1* | 8/2009 | Brainerd | G06F 16/248 |
| 2012/0221171 | A1* | 8/2012 | Shirakata | G08B 21/06 701/1 |
| 2018/0075309 | A1* | 3/2018 | Sathyanarayana | G06N 7/01 |
| 2018/0138090 | A1* | 5/2018 | Go | G11C 16/0483 |
| 2019/0155291 | A1* | 5/2019 | Heit | G05D 1/0088 |
| 2022/0284744 | A1* | 9/2022 | Alibeigi | G06V 20/59 |
| 2023/0376727 | A1* | 11/2023 | Kubosawa | G06N 3/0442 |
| 2024/0038059 | A1* | 2/2024 | Wittevrongel | G08G 1/0112 |

OTHER PUBLICATIONS

SAE J3016 Surface Vehicle Recommended Practice, 2018, pp. 1-35.

* cited by examiner

*Primary Examiner* — Dino Kujundzic
(74) *Attorney, Agent, or Firm* — NORTON ROSE FULBRIGHT US LLP; Gerard A. Messina

(57) ABSTRACT

A computer-implemented method for filtering operating scenarios during the operation of a vehicle. The method includes receiving at least one time series of data, storing time-ordered data points of the at least one time series of data in a first memory, generating a trace diagram for the time-ordered data points stored in the first memory, checking whether the trace diagram generated is new in comparison to one or more existing trace diagrams, and storing the time-ordered data points stored in the first memory, in a second memory if the trace diagram generated is new.

15 Claims, 4 Drawing Sheets

US 12,165,442 B2

FILTERING OF OPERATING SCENARIOS IN THE OPERATION OF A VEHICLE

CROSS REFERENCE

The present application claims the benefit under 35 U.S.C. § 119 of German Patent Application No. DE 10 2021 202 334.7 filed on Mar. 10, 2021, which is expressly incorporated herein by reference in its entirety.

BACKGROUND INFORMATION

Autonomous driving may be viewed as an open-context problem, since not all later operating/driving scenarios of a vehicle operating at least semi-autonomously can be known already in all their possible details and variants at the time of development, (that is, prior to selling and handing the vehicle over to a consumer, for example). To solve this problem, machine-learning algorithms (e.g., for computer vision) may be trained and used, which are designed to generalize findings, (for example, object detection) and/or evaluations on the strength of unknown input (e.g., camera-, RADAR-, LIDAR data, . . . ), as well. However, the reliable and/or safe operation of the vehicle operating at least semi-autonomously continues to depend decisively on whether the systems of the at least semi-autonomously operating vehicle are prepared for as many and, specifically, relevant operating/driving scenarios as possible (and in particular, have been trained for the handling of all relevant operating/driving scenarios). The provision of field data (thus, data which are gathered from the at least semi-autonomously operating vehicles during operation) is important for this purpose. If an existing field-data record has gaps, an at least semi-autonomously operating vehicle engineered (e.g., trained) based on it may possibly be unable to handle operating/driving scenarios satisfactorily. For example, at any given moment, a new vehicle or a new traffic sign, which accordingly is not represented in an existing field-data record, may appear in the operating area of the at least semi-autonomously operating vehicle. In this situation, the at least semi-autonomously operating vehicle engineered (e.g., trained) based on this field-data record may make mistakes. It is therefore important to (continuously) identify and to close as many gaps in the training data record as possible. Field data such as vehicle speed and driving-environment data, for example, can be independent of the vehicle technology, and can then be transferred totally or partially (e.g., with appropriate scaling) to new development projects of vehicles operating at least semi-autonomously. The one or more vehicles which collect field data can, but do not have to be at least semi-autonomously operating vehicles, provided they are equipped (e.g., for other reasons) with an appropriate sensor system for acquiring the sensor data.

During the continuous acquisition of sensor data, a large volume of data may be accumulated. For example, such quantities of data may be transferred during operation/during travel and/or during vehicle servicing to a cloud server.

SUMMARY

A first general aspect of the present invention relates to a computer-implemented method for filtering operating scenarios during the operation of a vehicle. In accordance with an example embodiment of the present invention, the method includes receiving at least one time series of data, storing time-ordered data points of the at least one time series of data in a first memory, generating a trace diagram for the time-ordered data points stored in the first memory, checking whether the trace diagram generated is new in comparison to one or more existing trace diagrams, storing the time-ordered data points stored in the first memory, in a second memory if the trace diagram generated is new.

A second general aspect of the present invention relates to a computer program which is engineered to carry out the computer-implemented method according to the first general aspect (or an embodiment thereof).

A third general aspect of the present invention relates to a computer-readable medium or signal, which stores and/or contains the computer program according to the second general aspect.

A fourth general aspect of the present invention relates to a computer system, particularly a control unit of a vehicle, which is engineered to execute the computer program according to the second general aspect.

For example, the data (especially the operating/driving scenarios) may be used for recognizing corner cases, based on which gaps in the design of the systems of the at least semi-autonomously operating vehicle may then be closed. Corner cases, which may occur in the operation and especially during the travel of a vehicle, particularly a vehicle for (semi-) autonomous driving, are important (borderline) cases which may be taken into account in the design and testing of the vehicle during development and/or series production, in order to ensure reliable and safe operation of the vehicle. Corner cases may be described via one, several or many time records (for example, vehicle speed, steering angle, sensor data of an imaging system, position data, . . . ), the time period of a few interrupts of a control unit (e.g., with 100 Hz timing) being able to extend over one or more seconds, up to one or more minutes and/or one or more hours.

The one or more (e.g., more than 2, more than 3, more than 4, more than 5, more than 10, more than 20, more than 50, more than 100, more than 500, or more than 1000) time series (or time records) may be acquired during the operation/during the travel of one or more vehicles. However, the volumes of data accumulating during the continuous acquisition of data of the at least one time series, especially of sensor data, may be large. In fact, subject to the data density in the time records and depending on the size of the fleet, for example, usually large amounts of data accrue in the process, which take up a great deal of storage space (e.g., in a cloud server). Alternatively or additionally, the evaluation of such a volume of data may require a great deal of computing time. Particularly in cases in which the time records are collected not only in test phases during development, but also after the sale and transfer of the vehicles to consumers, in order to be able to improve the functionality (e.g. computer vision) continuously via updates, the fleet may include more than 1e2, more than 1e3, more than 1e4, more than 1e5, more than 1e6, or more than 1e7 vehicles, for example.

In addition, such quantities of data usually exhibit high redundancy. First of all, this data volume overwhelmingly describes normal operating/driving scenarios that frequently are already known (for example, straight-ahead driving on the highway with occasional lane changes for passing). Indeed, straight corner cases, for example, can be improbable, particularly in the case of higher-dimensional parameter spaces. Secondly, each time record by itself or in combination with other time records may contain redundant information (e.g., data points in constant phases or proportionalities between signals such as vehicle speed and frequency of rotation of a drive engine in certain driving states).

One advantage of the trace diagrams may be seen in that, by using trace diagrams, the one or more operating/driving scenarios is/are stored in aggregated manner, and thereby in a manner that (to the greatest extent possible) is free of redundancy. By reconstruction, for example, by a simulation, operating/driving scenarios may then (e.g., later) be generated again from these trace diagrams, which match up essentially with the original operating/driving scenarios. In this sense, the trace diagrams may be viewed as a reversible compression. The storage space required and particularly the storage space required in the vehicle may thereby be reduced.

Such a reduction in the quantity of data is advantageous, since even if the vehicle is connected to a cloud server (alternatively, for example, data may also first be tapped during the next servicing and loaded onto a cloud server), the data must be stored at least temporarily in the vehicle (e.g., here in the second memory).

In addition, trace diagrams may be visualized (in a two-dimensional plane) by nodes and edges, for example, and thereby afford development and test engineers an additional perspective of operating/driving scenarios beyond time records. For instance, the nodes may be represented in different size and/or different color (e.g., according to a heat map). In this way, for example, frequency and/or dwell time may be represented graphically and therefore illustratively.

The efficient storage of operating/driving scenarios in trace diagrams may be used, e.g., to determine new and/or unknown corner cases. To that end, for example, an operating/driving scenario may be transformed into a trace diagram and compared to operating/driving scenarios already known and stored as trace diagrams. In contrast to the direct comparison of operating/driving scenarios, efficiency may thereby be improved.

The term "vehicle" includes any devices which transport passengers and/or freight. A vehicle may be a motor vehicle (for example, an automobile or a truck), but may also be a railroad vehicle. However, floating and flying devices may also be vehicles.

Correspondingly, the term "at least semi-autonomously operating vehicle" includes any devices which transport passengers and/or freight in at least semi-autonomous manner. An at least semi-autonomously operating vehicle may be a motor vehicle (for example, an automobile or a truck), but may also be a railroad vehicle. However, floating and flying devices may also be at least semi-autonomously operating vehicles. The attribute "at least semi-autonomously" expresses that the vehicle is controlled autonomously (that is, without participation of a user) at least in some situations and/or at least at some times and/or that certain systems of the vehicle (e.g., assistance systems) autonomously assist a driver at least occasionally (for example, an emergency braking system or a lane-following assistance system). In particular, the present disclosure relates to assisted and/or at least semi-autonomous motor vehicles, which is why in the following, aspects of the disclosure are therefore explained using examples of motor vehicles operating at least semi-autonomously (including assisted motor vehicles), (e.g., autonomous vehicles of the SAE J3016 autonomy levels 1 to 5). However, the corresponding aspects are also transferable to other types of vehicles operating at least semi-autonomously, (provided they do not relate to specific circumstances of at least semi-autonomously operating motor vehicles).

The term "user" includes any person who is driving the vehicle, is transported by it or is monitoring its operation. A user may be a passenger of a vehicle (especially a driver). However, a user may also be located outside of the vehicle and be controlling and/or monitoring it, for example (e.g., during a parking maneuver or from a remote center).

An "operating scenario" may be any scenario which occurs during the operation of the vehicle. For instance, an operating scenario may be a certain driving situation. An operating scenario may relate to a period of limited duration during the operation of the vehicle (e.g., shorter than 10 min. or shorter than 1 min.). In this context, an operating scenario is not limited to scenarios in which the vehicle is moving (thus driving).

The term "driving scenario" is understood to be an operating scenario that occurs during the travel of the vehicle.

The term "sensor data" includes all data which are gathered for the vehicle or by the vehicle during operation of the vehicle. In this context, the sensor data may be collected by sensors of the vehicle. Sensor data may also be acquired outside of the vehicle (and transmitted to it). For example, GPS data (or other position data) are sensor data. The term "sensor data" also includes processing levels of the data, which are acquired by the respective sensors, as well as corresponding metadata. Additional examples may be found further below.

"Field data" include all data which accumulate in connection with the operation of one (or a large number) of vehicles and which are used, for example, for the engineering (e.g., training) of at least semi-autonomous vehicles. For instance, field data may be used to generate corresponding operating scenarios in a simulation environment in order to train at least semi-autonomous vehicles (or rather, the systems contained in them). A "field-data record" is a body of field data. In some cases, the field-data record may contain the field data in a form structured according to a single predetermined schema. However, the field-data record may be made up of various subdata records, each of which is structured differently.

DETAILED DESCRIPTION OF EXAMPLE EMBODIMENTS

Figure 5:
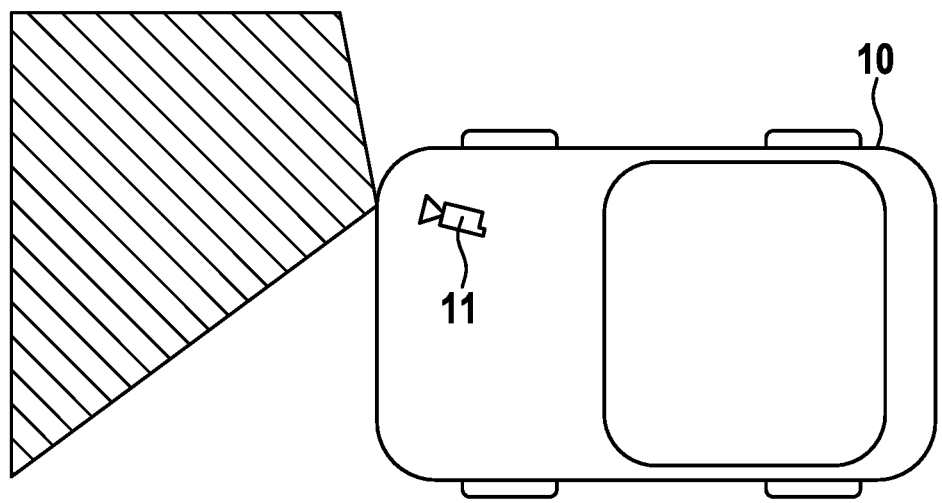
FIG. 5 shows a vehicle having at least one sensor for acquiring sensor data.

Vehicles 10 operating at least semi-autonomously have at least one sensor 11, as a rule several/many sensors 11 or sensor systems (e.g., cameras for different solid angles, RADAR, LIDAR, GPS, . . . ), via which one or more time series 20 of data, particularly sensor data, may be acquired. Alternatively or additionally, data may also include non-sensor data. For example, non-sensor data may be trigger data and/or inputs (e.g., an audio track) of a user, particularly an occupant, who is actively following the driving events and/or is participating in them. Such data may be analyzed with the aid of machine learning algorithms, for example, which have been trained on a corresponding training data record, in order to gain an understanding of the traffic situation and the area surrounding vehicle 10. Based on such information, a driving maneuver may then be selected and/or adjusted. A vehicle 10, e.g., an at least semi-autonomously operating vehicle, is represented schematically and by way of example in FIG. 5.

The one or more vehicles which collect field data can, but do not have to be at least semi-autonomously operating vehicles, provided they are equipped (e.g., for other reasons) with a suitable sensor system (for instance, cameras for different solid angles, RADAR, LIDAR, GPS, . . . ) for gathering the sensor data. For example, drivers may also declare vehicles that do not operate at least semi-autonomously, ready (e.g., for a fee) to install a camera system to sense the driving situation, which is integrated into a computer system according to the fourth general aspect of the present disclosure. The data thus acquired may likewise contribute to improving the functionality and/or safety of other vehicles operating at least semi-autonomously.

Figure 1:
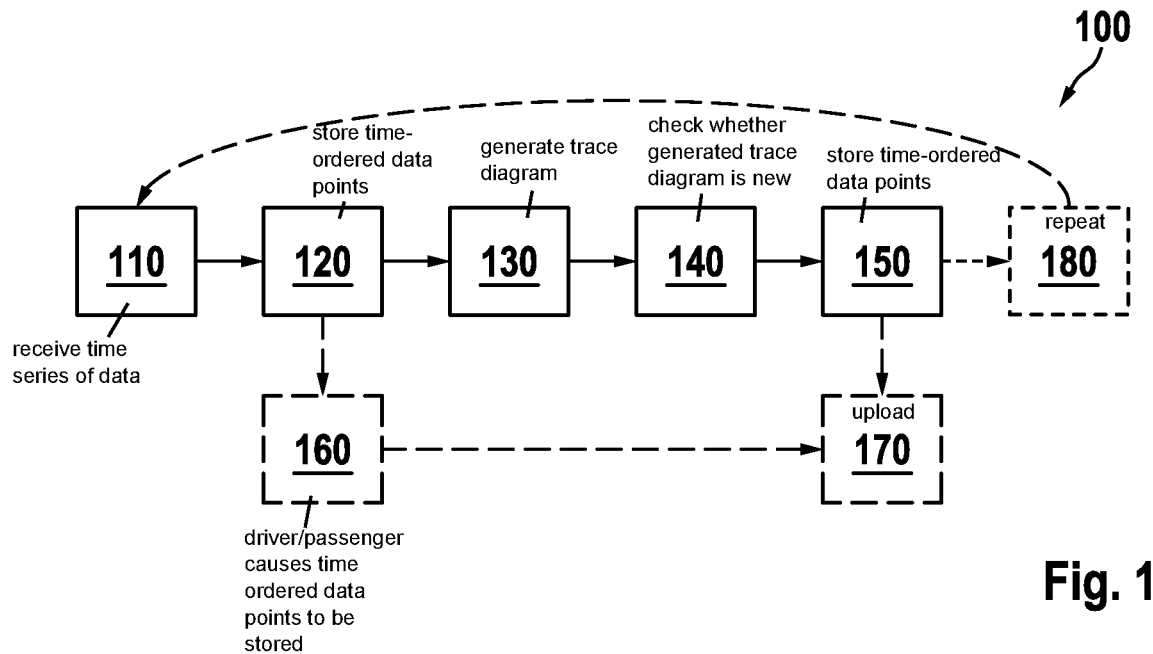
FIG. 1 is a flowchart which illustrates schematically the procedures of an example embodiment of the present invention.

A computer-implemented method 100 is disclosed for filtering operating/driving scenarios during the driving mode of a vehicle 10, which is represented schematically in FIG. 1. Method 100 includes receiving 110 at least one time series 20 of data. The data may be both sensor data as well as non-sensor data. For example, sensor data may include or be imaging data from at least one camera, RADAR system and/or LIDAR system. Non-sensor data may be trigger data, for instance, and/or inputs of the user. Such trigger data and/or inputs of the user may include evaluations on the strength of the natural intelligence of the user, which may be used as labels (ground truth) of the data in the training data record to further improve the machine learning algorithms, and particularly during supervised learning. Further user data may also be received from a remote control of the vehicle, and particularly from outside of the vehicle (e.g., during automated parking).

Method 100 also includes storing 120 time-ordered data points 21 of the at least one time series 20 of data in a first memory. In addition, method 100 includes generating 130 a trace diagram 30 for time-ordered data points 21 stored in the first memory.

The method furthermore includes checking 140 whether trace diagram 30 generated is new (or is evaluated as new, see below) in comparison to one or more existing trace diagrams 40. Method 100 further includes storing 150 time-ordered data points 21 stored in the first memory, in a second memory if trace diagram 30 generated is new (or is evaluated as new). Otherwise, that is, if generated trace diagram 30 has not been evaluated as new, the storage of time-ordered data points 21 stored in the first memory, in the second memory may be omitted. Checking 140 may thus be regarded as a filtering of operating/driving scenarios.

The one or more existing trace diagrams 40 may represent a (to the greatest extent possible) redundancy-free and compressed version of known operating/driving scenarios, and thus may be stored in small or large number (e.g., more than 2, more than 3, more than 4, more than 5, more than 10, more than 20, more than 50, more than 100, more than 200, more than 500, more than 1e3, more than 1e4, or more than 1e5) in a further memory, particularly in a database, within the vehicle. For example, the one or more existing trace diagrams 40 may be hard-coded in the further memory. In comparison to the storing of time-ordered data points, the storage space—which is limited in any case—within vehicle 10 may be used more efficiently by trace diagrams and/or costs may be reduced. Alternatively, the one or more existing trace diagrams 40 may also be retrieved on demand via a communication interface from a further (or the same) cloud server. The communication interface (also: backend interface) may also be used, for example, to download the one or more trace diagrams 40 from the cloud server at certain points in time (e.g., in each case upon start of the vehicle, at regular intervals according to the calendar, upon request of the user, . . . ) and to store them in the further memory. The one or more trace diagrams stored in the further memory may thus be updated.

In addition, the method may include the storing of generated trace diagram 30 in the further memory, particularly in the database, within the vehicle, if trace diagram 30 generated is new (or is evaluated as new). In fact, the one or more existing trace diagrams 40 may be accumulated by repeating method 100 and in each case storing generated trace diagram 30 over a certain (operating-) time, and may be stored in a database, for example. Alternatively or additionally, the one or more existing trace diagrams 40 (or a portion thereof) may be generated in in-vehicle learning processes. For example, existing trace diagrams 40 may be altered and/or adjusted over the service life of the vehicle.

The one or more time series 20 of data (that is, the sensor data) may be acquired—optionally in time steps with constant sampling rate—via at least one sensor 11 of a vehicle 10 during the operation and/or during the driving mode (the travel). Alternatively or additionally, data may be acquired through triggering or input on the part of the user.

The one or more time series 20 of data may include a video data stream, RADAR data, LIDAR data, position data (e.g., GPS, Galileo, etc.), environmental data, vehicle data and/or user data.

The time-ordered data points 21 of the one or more time series 20 of data may correspond to an immediately preceding period of time (in order to distinguish it from a period of time preceding randomly in the past) and/or to a number of immediately preceding data points of the at least one time series of data (moving window). For example, the immediately preceding period of time may amount to less than 0.5 seconds, less than 1 second, less than 2 seconds, less than 5 seconds, less than 30 seconds, less than 1 minute, less than 2 minutes, or less than 5 minutes. This period of time and/or this number may define a possible measure of overlap between time-ordered data points 21 of different but temporally adjacent implementations of method 100. In the case of constant sampling, the period of time may be equivalent to a number.

The time-ordered data points 21 of the one or more time series 20 of data may describe and/or characterize an operating/driving scenario. In practice, it may also occur that the time-ordered data points 21 of the one or more time series 20 of data describe and/or characterize only parts of an operating/driving scenario.

Figure 3:
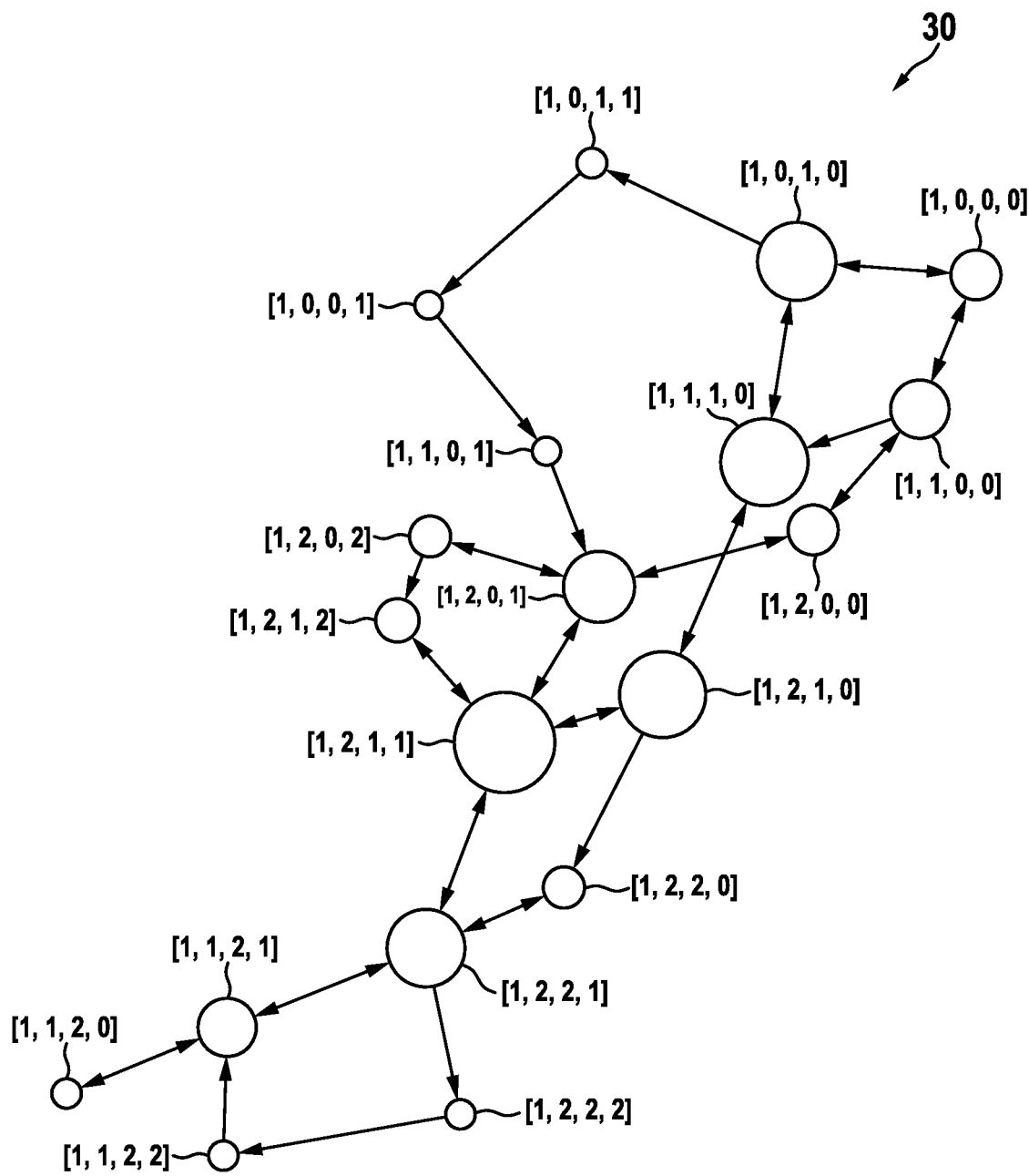
FIG. 3 shows an example of a trace diagram.

Trace diagram 30, represented in FIG. 3, for example, may be a graph. The graph may include one or more nodes, each node corresponding to a value range of data in a (vector-) space spanned by the value ranges of time-ordered data points 21. For example, the y-values per time series/sensor signal may be categorized into discrete classes (one-dimensional value ranges). From the one-dimensional value ranges, higher-dimensional value ranges may be formed by a direct product. The (higher-dimensional) value ranges of every two nodes of trace diagram 30 may be different. Overlaps between value ranges of every two nodes of trace diagram 30 may be avoided. Each value range may be a higher-dimensional sub-quantity of the (vector-) space spanned by one or more features. A node may correspond to a value range in the (vector-) space by assigning to the node a vector whose entries are coordinates with respect to a basis in the (vector-) space and/or enumerations of sub-quantities of the (vector-) space. For example, (higher-dimensional) intervals in the (vector-) space may be numbered consecutively.

In certain cases, it may be advantageous if the trace diagram includes at least one node multiple times. For example, such a node may represent an intermediate state which occurs in two respective operating/driving scenarios that nevertheless should be differentiated.

One (e.g., arbitrary) feature for characterizing an operating/driving state may include (or be) a time record and/or a value range (or a portion of the value range, particularly one value) of the time record. Alternatively or additionally, one (e.g., arbitrary) feature may include (or be) a parameter of the one or more time records or a parameter derived therefrom (e.g., intensity of the backlighting from camera data). In the exemplary case having four features where, for example, the four-dimensional vector [1, 2, 1, 1] is assigned to one node, the first entry (here: a 1) of the vector may be assigned to a value range of the vehicle speed from 20 km/h to 50 km/h, for instance. In addition, the second entry (here: a 2) of the vector may be assigned, e.g., to a value range of the steering angle from 0° to +5°. Furthermore, for example, the third entry (here: a 1) of the vector may be assigned to an intensity of the backlighting of 3 derived from camera data (or to a value range, e.g., on a unitless scale from 1 to 5). In addition, for example, the fourth entry (here: a 1) of the vector may be assigned to a (discrete) classification result for detecting an obstacle on the roadway. Any other possible node of trace diagram 30 may likewise have a four-dimensional vector (e.g., [2, 0, 1, 1]), each with different entries. In this case, the entries of two vectors may be regarded as different if they differ at least in one entry. However, the vectors of the nodes of a trace diagram may relate to the same features. For example, the first entry (here: a 2) of the vector of the other node may likewise relate to the time record of the vehicle speed, and particularly to a value range of the vehicle speed, e.g., from 50 km/h to 70 km/h, etc.

In addition, the graph may include no or one edge between every two nodes, where each edge has at least one arrow direction, and optionally may also have opposite arrow directions, the arrow direction in each case indicating the direction of a transition between value ranges belonging to the nodes.

Each node may be assigned a frequency, which is represented optionally by the size of the node. Alternatively or additionally, each node may be assigned a dwell time that is represented optionally by a color coding. Alternatively or additionally, each edge (or each edge and its direction) may be assigned a transition frequency, which optionally, may be represented by a further color coding (e.g., in each case the arrow tips of edges may be colored accordingly). The display capability of trace diagrams may be useful for development and/or test engineers.

The at least one trace diagram 30 may be a data structure which represents time-ordered data points 21 in aggregated and compressed fashion (that is, free of redundancy to the greatest extent possible). In particular, time-ordered data points 21 may be sensor signals of the vehicle or of the vehicles of the vehicle fleet. For instance, the data structure may be stored in an xml or json format. In so doing, metadata (e.g., for the unambiguous identification of vehicles in the vehicle fleet) may also be stored.

Trace diagram 30 implicitly includes a selection of one or more features, since each node in trace diagram 30 corresponds to a specific value range in one and the same (vector-) space spanned by the feature or features. In other words, each trace diagram 30 may be assigned to one or more features. FIG. 3, for example, shows a trace diagram 30 having four features, each node being assigned one four-dimensional vector (e.g., [1, 2, 1, 1]), whose entries relate to the basis defined by the feature or features in a vector space.

Generating 130 of trace diagram 30 for time-ordered data points 21 stored in the first memory may first of all include clustering of y-values of time-ordered data points 21 of the at least one time series 20 of data or the multiple time series 20 of data into at least two clusters in a (vector-) space, whose dimensionality corresponds to the number of the at least one time series 20 of data or the multiple time series 20 of data, optionally with the aid of unsupervised learning. In this context, as an option, unsupervised machine learning may be used (e.g., k-means clustering or other clustering methods). For example, the y-values of time-ordered data points 21 of two time series 20 (e.g., vehicle speed and steering angle) may be mapped (as an aggregate of points) into a two-dimensional (vector-) space, and two-dimensional clusters, that is, two-dimensional sub-quantities, may be defined in the two-dimensional (vector-) space.

Alternatively, generating 130 of trace diagram 30 for time-ordered data points 21 stored in the first memory (or additionally, the clustering of y-values of time-ordered data points 21 of the at least one time series 20 of data or the multiple time series 20 of data into at least two clusters in the (vector-) space) may first of all include the clustering of y-values of the time-ordered data points of each of the at least one time series 20 of data or the multiple time series 20 of data separately into one-dimensional clusters in each instance, at least two one-dimensional clusters being able to be defined for at least one time series 20 of data. In the case of multiple time series 20, generating 130 the trace diagram (or the clustering of y-values of time-ordered data points 21 of the at least one time series 20 of data or the multiple time series 20 of data into at least two clusters in a (vector-) space) may then include the creation of higher-dimensional clusters in a (vector-) space, whose dimensionality corresponds to the number of the multiple time series 20 of data, by combining one-dimensional clusters per time series 20 of data. For example, if the y-values of time-ordered data points 21 of one time series (e.g., the vehicle speed) are clustered into two clusters, and the y-values of time-ordered data points 21 of a second time series (e.g., the steering velocity) are clustered into three clusters, then six higher-dimensional (here: two-dimensional) clusters may be defined in the (vector-) space.

In addition, generating 130 the trace diagram may include identifying at least one cluster (e.g., a higher-dimensional value range) as node in trace diagram 30. As a rule, at least two clusters are identified as node, since otherwise the trace diagram is unable to contain any edge and therefore any transition between states. The creation of nodes in the trace diagram may include a state-to-vector transformation with respect to the one or more features. In addition, generating 130 the trace diagram may include analyzing the transitions between clusters on the basis of time-ordered data points 21 and identifying at least one transition as edge between two nodes in trace diagram 30. As an option, generating 130 the trace diagram may include evaluating the frequency of a cluster and/or the dwell time of a cluster on the basis of time-ordered data points 21. Optionally, generating 130 the trace diagram may include adding the frequency of a cluster and/or the dwell time of a cluster to the node identified with the cluster in trace diagram 30. The cluster formation may be engineered in such a way that in the course of the cluster formation, irrelevant and/or redundant information is eliminated in the one or more time records.

Checking 140 whether generated trace diagram 30 is new (or is evaluated as new) compared to the one or more existing trace diagrams 40 may include use of a machine learning algorithm which is designed, and has been trained on the basis of training data, to output a categorical (e.g., by a classification) and/or quantifiable measure (e.g., by a regression) for the newness of trace diagram 30.

Checking 140 whether generated trace diagram 30 is new (or is evaluated as new) compared to the one or more existing trace diagrams 40 may (thus) include a predetermined (similarity-) criterion, which is designed to be able to compare at least two trace diagrams. To that end, for example, first of all the number of nodes in the two trace diagrams may be compared. Alternatively or additionally, the number of edges in the two trace diagrams may be compared. In addition, for example, the number of matching nodes in the two trace diagrams may be determined. Alternatively or additionally, the number of matching edges between matching nodes in the two trace diagrams may also be determined. Alternatively or additionally, the parameters assigned to the nodes and/or edges may be compared to each other. For instance, in so doing, it may be advantageous to arrange the nodes in an ordered manner according to their vector. In this way, for example, each two non-matching but close nodes from both trace diagrams may also be identified. Alternatively or additionally, the trace diagrams may be embedded into a (metric) space. Thus, a distance between the trace diagrams may then be determined via a metric. In so doing, conventional distance measures such as the Levenshtein distance (e.g., after transformation of the trace diagrams into one character string each), the Hamming distance, average shortest paths and/or Euclidean surfaces may be used. In addition, a predetermined threshold value may be defined for the distance between trace diagrams, above which the disparity is evaluated as new and/or unknown.

The first memory may be a circular buffer. A circular buffer may be practical for temporary storage. The first and the second memory may also be logic units of one and the same memory.

A driver or a passenger (in general: user) of vehicle 10 may cause 160 (e.g., via a user interface of the vehicle) time-ordered data points 21 (that is, the time-ordered data points stored most recently in the first memory) to be stored in the second memory. As a result, those operating/driving scenarios which the user has perceived as interesting, problematic and/or uncertain may be further analyzed and in the future, at times prevented or improved.

In addition, time-ordered data points 21 stored in the second memory may be uploaded 170 manually (e.g., via the user interface of the vehicle and/or a mobile device located in the vehicle) or automatically (e.g., in a certain periodicity: every day, every week, every month, every year, . . . ) via at least one communication module of vehicle 10 to a (cloud) server outside of vehicle 10. Thus, data which are intended for the upload to the (cloud) server may be stored in the second memory. Alternatively or additionally, trace diagram 30 generated in each case (upon repetition of method 100) may also be uploaded 170—provided, for example, it has been stored in the second memory after successful checking 140—to the (cloud) server outside of vehicle 10. By uploading 170, time-ordered data points 21 and/or generated trace diagrams 30 and thus the operating/driving scenarios recognized as new may be analyzed and evaluated by development and/or test engineers, for example. Alternatively or additionally, the uploaded data may be utilized to improve vehicle 10 (e.g., via over-the-air update), particularly the at least semi-autonomously operating vehicle, or further vehicles (e.g., in new development projects). For example, if desired, the operating/driving scenarios in the uploaded data may be labeled and/or may supplement and ideally complete the training data record for the supervised learning.

The method may be repeated 180 in a next time step, with the proviso that receiving 110 the one or more time series 20 of data is an updating of the one or more time series 20 of data. In the case of a circular buffer as first memory, the index in the circular buffer may be incremented, modulo the size of the circular buffer.

Figure 4:
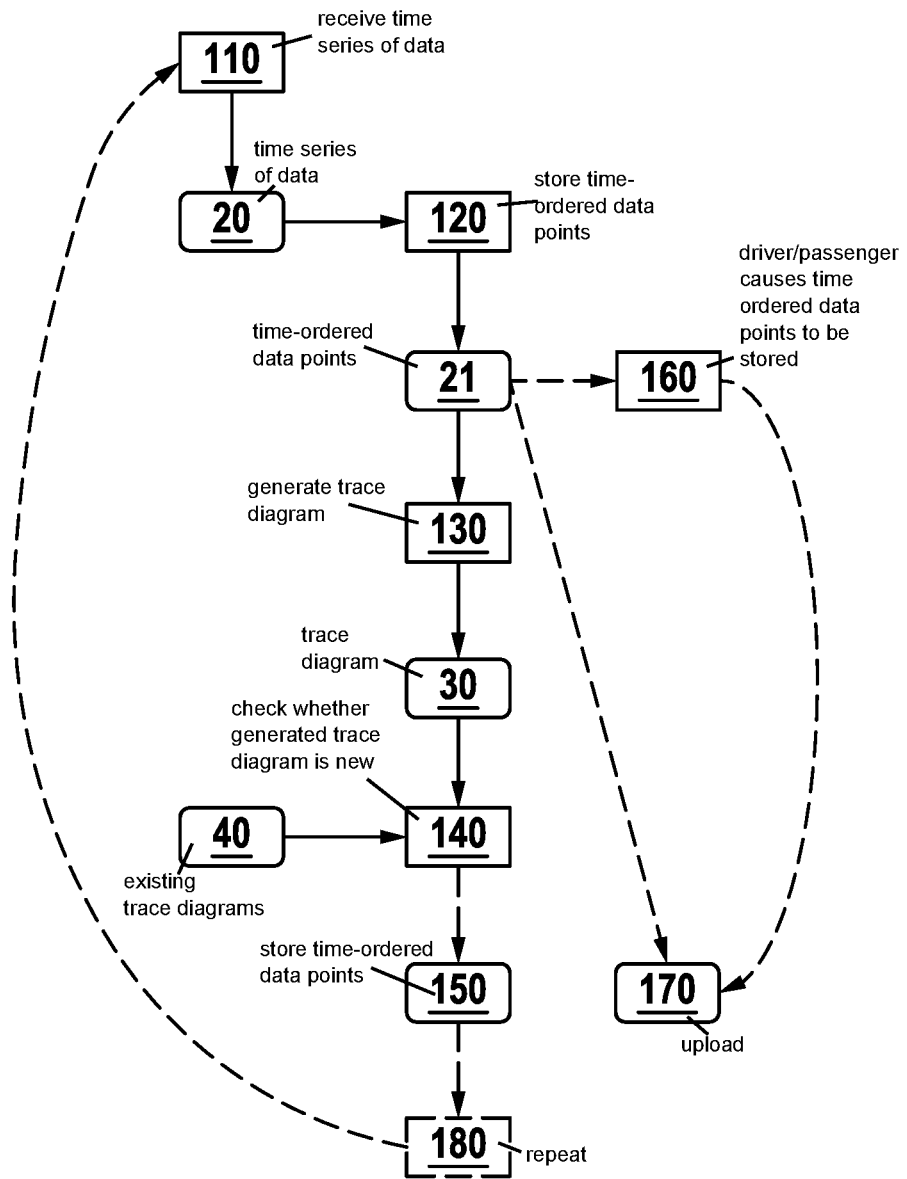
FIG. 4 shows a specific embodiment for a flowchart which illustrates schematically the procedures of an example embodiment of the present invention.

A specific embodiment of method 100 for filtering operating/driving scenarios during the driving mode of a vehicle 10 is represented in FIG. 4.

In addition, a computer program 200 is disclosed, which is designed to carry out computer-implemented method 100 for filtering operating/driving scenarios during the operation of a vehicle (e.g., during the travel of the vehicle). For example, computer program 200 may exist in interpretable or in compiled form. It may be loaded for execution (e.g., as byte sequence) into the RAM of a control unit or computer.

In addition, a computer-readable medium or signal 300 is disclosed, which stores and/or contains computer program 200. For instance, the medium may include one of RAM, ROM, EPROM, . . . , in which the signal is stored.

Figure 2:
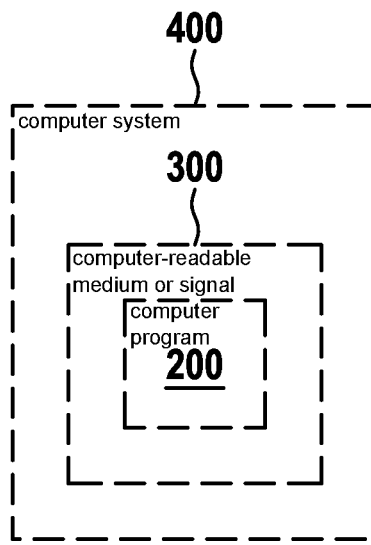
FIG. 2 shows in schematic fashion a computer program, a computer-readable medium or signal and a computer system.

In addition, a computer system 400 is disclosed, represented schematically in FIG. 2, particularly a control unit of a vehicle 10, which is designed to execute computer program 200. In particular, computer system 400 may include at least one processor and at least one random-access memory. Specifically, computer system 400 may include the first memory (e.g., as circular buffer) and/or the second memory. In addition, computer system 400 may include the further memory, e.g., with the database. Alternatively or additionally, computer system 400 may include the communication interface, via which a connection to the (cloud) server is able to be established.

What is claimed is:

1. A computer-implemented method comprising:
   during a drive of a vehicle:
   obtaining, by the vehicle, at least one time series of data that is at least partly generated by the vehicle and that corresponds to the drive;
   storing, by the vehicle, time-ordered data points of the at least one time series of data in a first memory; and
   generating, by a processor of the vehicle, a trace diagram for the time-ordered data points stored in the first memory;
   checking whether the trace diagram generated is new in comparison to one or more existing trace diagrams;
   in response to a result of the checking being that the trace diagram is new, storing the time-ordered data points, stored in the first memory, in a second memory;
   based on the storage of the trace diagram in the second memory, updating an autonomous driving functionality of the vehicle according to the trace diagram in the second memory; and
   performing, by the vehicle, an autonomous drive using the updated autonomous driving functionality.

2. The method as recited in claim 1, wherein the one or more time series of data are acquired at least partly via at least one sensor of the vehicle.

3. The method as recited in claim 1, wherein the one or more time series of data include at least one of: data of a video data stream, RADAR data, LIDAR data, position data, environmental data, vehicle data, and user data.

4. The method as recited in claim 1, wherein the time-ordered data points of the one or more time series of data correspond to at least one of an immediately preceding period of time and a number of immediately preceding data points of the at least one time series of data.

5. The method as recited in claim 1, wherein the time-ordered data points of the one or more time series of data characterize an operating scenario.

6. The method as recited in claim 1, wherein the trace diagram is a graph, including:
one or more nodes, each node corresponding to a value range of data in a space spanned by value ranges of the time-ordered data points; and
for at least some pairs of the nodes, a respective edge between the respective nodes of the respective pair, wherein each edge has at least one arrow direction, the arrow direction in each case indicating a direction of a transition between value ranges belonging to the nodes of the respective pair.

7. The method as recited in claim 6, wherein each of one or more of the edges has opposite arrow directions.

8. The method as recited in claim 6, wherein the generating of the trace diagram for the time-ordered data points stored in the first memory includes:
clustering y-values of the time-ordered data points of the at least one time series of data into at least two clusters in a space whose dimensionality corresponds to a number of the at least one time series of data;
identifying at least one cluster as a node in the trace diagram;
analyzing the transitions between clusters on the basis of the time-ordered data points; and
identifying at least one transition as edge between two nodes in the trace diagram.

9. The method as recited in claim 8, wherein the clustering is performed using unsupervised learning.

10. The method as recited in claim 8, further comprising:
evaluating at least one of a frequency and dwell time of a cluster based on the time-ordered data points; and
adding the at least one of the frequency and dwell time of the cluster to the node identified with the cluster in the trace diagram.

11. The method as recited in claim 1, wherein the first memory is a circular buffer.

12. The method as recited in claim 1, wherein the time-ordered data points stored in the second memory are uploaded manually or automatically via at least one communication module of the vehicle to a server outside of the vehicle.

13. The method as recited in claim 1, wherein the method is repeated in a next time step, by which the first memory is updated with another time series of data.

14. A non-transitory computer-readable medium on which is stored instructions that are executable by a computer of a vehicle and that, when executed by the computer, cause the computer to perform the following steps:
during a drive of the vehicle:
obtaining at least one time series of data that is at least partly generated by the vehicle and that corresponds to the drive;
storing time-ordered data points of the at least one time series of data in a first memory; and
generating a trace diagram for the time-ordered data points stored in the first memory;
checking whether the trace diagram generated is new in comparison to one or more existing trace diagrams;
in response to a result of the checking being that the trace diagram is new, storing the time-ordered data points, stored in the first memory, in a second memory; and
performing an autonomous drive using an autonomous driving functionality that is updated according to the trace diagram based on the storage of the trace diagram in the second memory.

15. A computer system, comprising:
a first memory of a vehicle; and
a control unit of the vehicle, wherein the control unit is configured to:
during a drive of the vehicle:
obtain at least one time series of data that is at least partly generated by the vehicle and that corresponds to the drive;
store time-ordered data points of the at least one time series of data in the first memory; and
generate a trace diagram for the time-ordered data points stored in the first memory;
check whether the trace diagram generated is new in comparison to one or more existing trace diagrams;
in response to a result of the checking being that the trace diagram is new, store the time-ordered data points, stored in the first memory, in a second memory; and
perform an autonomous drive using an autonomous driving functionality that is updated according to the trace diagram based on the storage of the trace diagram in the second memory.

* * * * *